United States Patent
Kobayashi (10) Patent No.: US 12,236,978 B2
(45) Date of Patent: Feb. 25, 2025

(54) MAGNETIC DISK DEVICE AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Ryo Kobayashi, Setagaya Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/442,489

(22) Filed: Feb. 15, 2024

(65) Prior Publication Data

US 2024/0304218 A1   Sep. 12, 2024

(30) Foreign Application Priority Data

Mar. 6, 2023   (JP) ................................ 2023-033560

(51) Int. Cl.
G11B 20/18 (2006.01)
G11B 27/36 (2006.01)

(52) U.S. Cl.
CPC .......... *G11B 20/1816* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 7,864,476 B2 | 1/2011 | Ehrlich | |
| 9,129,658 B1* | 9/2015 | Yamamoto | G11B 27/36 |
| 9,405,668 B1* | 8/2016 | Fallone | G06F 9/4401 |
| 9,418,699 B1 | 8/2016 | Gibbons et al. | |
| 10,860,490 B2 | 12/2020 | Feist et al. | |
| 2006/0104178 A1* | 5/2006 | Nakajo | G11B 7/0062 |
| 2010/0188767 A1* | 7/2010 | Hirose | G11B 20/1816 |
| 2020/0302961 A1* | 9/2020 | Takada | G11B 20/1883 |
| 2022/0113906 A1* | 4/2022 | Hall | G11B 5/012 |
| 2024/0105230 A1* | 3/2024 | Maruyama | G11B 5/596 |
| 2024/0304218 A1* | 9/2024 | Kobayashi | G11B 27/36 |

* cited by examiner

*Primary Examiner* — Peter Vincent Agustin

(74) *Attorney, Agent, or Firm* — Knobbe, Martens, Olson & Bear, LLP (57) ABSTRACT

According to an embodiment, a magnetic disk is provided with a first area including a plurality of blocks and a second area designated as a write destination by a host. The first memory is a volatile memory that receives write data received from the host. A controller estimates a degree of influence of ATI for each of the plurality of blocks, and sets a first block in which the degree of influence of ATI reaches the first threshold value and two blocks adjacent thereto to be unwritable. The controller selects one of one or more blocks which are not set to be unwritable and have free space among the plurality of blocks, and stores a copy of write data in the first memory in the selected one block at least for a period until the write data is written to the second area.

20 Claims, 10 Drawing Sheets

| MC BLOCK NUMBER | #0 | #1 | #2 | #3 | #4 | #5 | #6 | #7 |
|---|---|---|---|---|---|---|---|---|
| ATI COUNTER | 0 (EMPTY) | 0 (EMPTY) | 0 (EMPTY) | 0 (EMPTY) | 9 | 0 (EMPTY) | 0 (EMPTY) | 5 |

S701: WRITE COPY DATA

FIG.13B

| MC BLOCK NUMBER | #0 | #1 | #2 | #3 | #4 | #5 | #6 | #7 |
|---|---|---|---|---|---|---|---|---|
| ATI COUNTER | 0 (EMPTY) | 0 (EMPTY) | 0 (EMPTY) | 0 | 10 (=9+1) | 0 (EMPTY) | 0 (EMPTY) | 5 |

UNWRITABLE

S702: INCREMENT ATI COUNT ACCORDING TO WRITE TO MC BLOCK #3, AND SET MC BLOCK #4 AND MC BLOCKS ADJACENT THERETO TO BE UNWRITABLE WHEN DIFFERENCE FROM MINIMUM VALUE REACHES FIRST THRESHOLD VALUE "10"

FIG.13C

| MC BLOCK NUMBER | #0 | #1 | #2 | #3 | #4 | #5 | #6 | #7 |
|---|---|---|---|---|---|---|---|---|
| ATI COUNTER | 0 (EMPTY) | 0 (EMPTY) | 0 (EMPTY) | 0 | 0 (EMPTY) | 0 (EMPTY) | 0 (EMPTY) | 5 |

S703: COMPLETE INVALIDATION OF ALL COPY DATA IN MC BLOCK #4, RESET ATI COUNTER TO "0", AND CANCEL SETTING OF MC BLOCK #4 AND MC BLOCKS ADJACENT THERETO TO BE UNWRITABLE

MAGNETIC DISK DEVICE AND METHOD

CROSS-REFERENCE TO RELATED APPLICATIONS

This application is based upon and claims the benefit of priority from Japanese Patent Application No. 2023-033560, filed on Mar. 6, 2023; the entire contents of which are incorporated herein by reference.

FIELD

The present embodiment described herein relate generally to a magnetic disk device and a method.

BACKGROUND

In the related art, there is a magnetic disk device having a cache area on a magnetic disk. In such a magnetic disk device, data requested to be written by the host can be temporarily stored in the cache area.

Adjacent track interference (ATI) is known as one of influences on adjacent tracks at the time of writing to a magnetic disk. The influence of ATI received by the adjacent track accumulates according to the number of writes for one track, and the data of the adjacent track is eventually difficult to be read. Therefore, before it is difficult to read the data of the adjacent track, all the data of the adjacent track is rewritten.

DETAILED DESCRIPTION

According to the present embodiment, a magnetic disk device includes a magnetic disk, a first memory, a magnetic head, and a controller. The magnetic disk is provided with a first area including a plurality of blocks and a second area designated as a write destination by a host. The first memory is a volatile memory that receives write data received from the host. The magnetic head writes and reads data to and from the magnetic disk. The controller estimates a degree of influence of adjacent track interference (ATI) for each of the plurality of blocks. The controller sets the first block in which the degree of influence of ATI reaches the first threshold value among the plurality of blocks and the two blocks adjacent to the first block among the plurality of blocks as unwritable. The controller selects one of one or more blocks that are not set to be unwritable and have free space among the plurality of blocks, and stores a copy of write data in the first memory in the selected one block at least for a period until the write data is written to the second area.

Hereinafter, a magnetic disk device and a method according to an embodiment will be described in detail with reference to the accompanying drawings. In addition, the present invention is not limited by the following embodiment.

Embodiment

Figure 1:
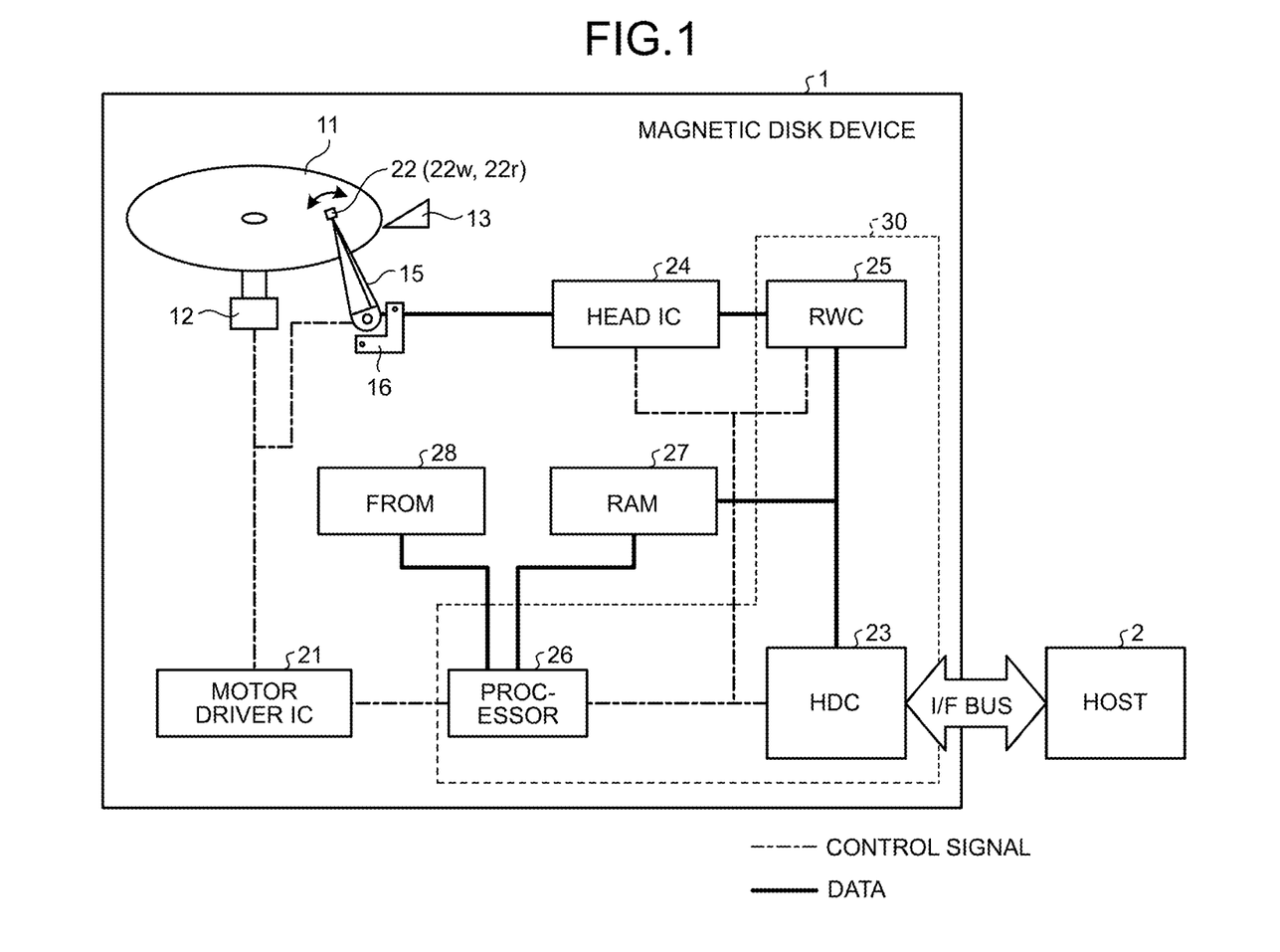
FIG. 1 is a schematic diagram illustrating an example of a configuration of a magnetic disk device according to the embodiment.

FIG. 1 is a schematic diagram illustrating an example of a configuration of a magnetic disk device 1 according to the embodiment.

The magnetic disk device 1 is connected to a host 2. The magnetic disk device 1 can receive an access command such as a write command or a read command from the host 2.

The magnetic disk device 1 includes a magnetic disk 11 having a magnetic layer formed on a surface thereof. The magnetic disk device 1 writes data to the magnetic disk 11 or reads data from the magnetic disk 11 in response to the access command.

The access command includes a logical address. The magnetic disk device 1 provides a logical address space to the host 2. The logical address indicates a position in the address space. The host 2 designates a position where data is written or a position where data is read by using the logical address. That is, the logical address is position information designated by the host 2. The logical address is referred to as a logical block address (LBA).

Data is written and read via a magnetic head 22. In addition to the magnetic disk 11, the magnetic disk device 1 includes a spindle motor 12, a ramp 13, an actuator arm 15, a voice coil motor (VCM) 16, a motor driver integrated circuit (IC) 21, a magnetic head 22, a hard disk controller (HDC) 23, a head IC 24, a read/write channel (RWC) 25, a processor 26, a RAM 27, and a flash read only memory (FROM) 28.

The magnetic disk 11 is rotated at a predetermined rotation speed by the spindle motor 12 attached coaxially. The spindle motor 12 is driven by the motor driver IC 21.

The processor 26 controls the rotation of the spindle motor 12 and the rotation of the VCM 16 via the motor driver IC 21.

The magnetic head 22 writes and reads information to and from the magnetic disk 11 by a write core 22w and a read core 22r provided therein. The magnetic head 22 is attached to a distal end of the actuator arm 15. The magnetic head 22 is moved in the radial direction of the magnetic disk 11 by the VCM 16. Note that a plurality of the write cores 22w or a plurality of the read core 22r, or a plurality of the write cores 22w and a plurality of the read core 22r provided in the magnetic head 22 may be provided for the single magnetic head 22.

For example, when the rotation of the magnetic disk 11 is stopped, the magnetic head 22 is moved onto the ramp 13. The ramp 13 is configured to hold the magnetic head 22 at a position spaced apart from the magnetic disk 11.

The head IC 24 amplifies and outputs a signal read from the magnetic disk 11 by the magnetic head 22 during the read operation, and supplies the signal to the RWC 25. In addition, the head IC 24 amplifies a signal corresponding to the data to be written supplied from the RWC 25 and supplies the amplified signal to the magnetic head 22 during the write operation.

The HDC 23 controls transmission and reception of data with the host 2 via the I/F bus.

The RAM 27 is used as a buffer for data to be written to the magnetic disk 11 and data read from the magnetic disk 11.

The RAM 27 is used as an operation memory by the processor 26. The RAM 27 is used as an area in which firmware is loaded and an area in which various types of management data are temporarily stored.

The RAM 27 includes a volatile memory capable of high-speed operation. The type of the memory constituting the RAM 27 is not limited to a specific type. The RAM 27 can be configured by, for example, a dynamic random access memory (DRAM), a static random access memory (SRAM), or a combination thereof. Note that the RAM 27 may include an any nonvolatile memory. Details of a method of using the RAM 27 will be described later.

The RWC 25 performs modulation such as error correction coding on data to be written supplied from the HDC 23 in units of sectors, and supplies the modulated data to the head IC 24. In addition, the RWC 25 demodulates a signal read from the magnetic disk 11 and supplied from the head IC 24, including error correction in units of sectors, to output the demodulated signal to the HDC 23 as digital data.

The processor 26 is, for example, a central processing unit (CPU). The RAM 27 and the flash read only memory (FROM) 28 are connected to the processor 26.

The FROM 28 is a nonvolatile memory. The FROM 28 stores firmware (program data), various operation parameters, and the like.

The processor 26 performs overall control of the magnetic disk device 1 according to the firmware stored in the FROM 28. For example, the processor 26 loads firmware from the FROM 28 or the magnetic disk 11 to the RAM 27, and executes control of the motor driver IC 21, the head IC 24, the RWC 25, the HDC 23, and the like according to the loaded firmware.

The FROM 28 is used as a save destination of data in the RAM 27 when the power supply interruption occurs.

The configuration including the HDC 23, the RWC 25, and the processor 26 can also be regarded as a controller 30 that controls the operation of the magnetic disk device 1. In addition to these components, the controller 30 may include other components (for example, the RAM 27, the FROM 28, or the like).

The firmware program may be stored in the magnetic disk 11. Some or all of the functions of the processor 26 may be implemented by a hardware circuit such as a field-programmable gate array (FPGA) or an application specific integrated circuit (ASIC).

Note that the number of the magnetic disks 11 included in the magnetic disk device 1 is not limited to one. Furthermore, the magnetic disk device 1 may include actuator arms 15 and magnetic heads 22 in a number corresponding to the number of magnetic disks 11. In addition, in a case where the magnetic disk device 1 includes a plurality of magnetic heads 22, the plurality of magnetic heads 22 may be integrally moved, or the plurality of magnetic heads 22 may constitute a plurality of groups that is independently movable.

Figure 2:
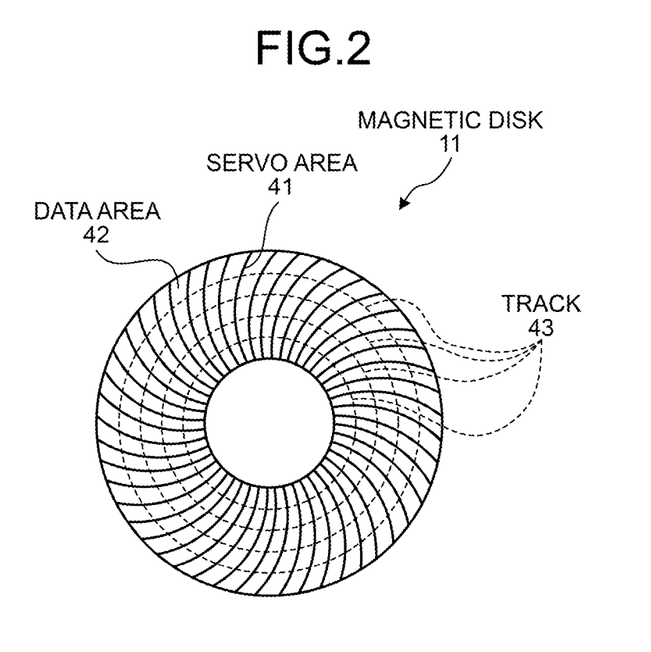
FIG. 2 is a diagram illustrating an example of a configuration of a magnetic disk according to the embodiment.

FIG. 2 is a diagram illustrating an example of a configuration of the magnetic disk 11 according to the embodiment. Servo data used for positioning the magnetic head 22 is written to the magnetic layer formed on the surface of the magnetic disk 11 by, for example, a servo writer or self-servo write (SSW).

FIG. 2 illustrates servo areas 41 disposed radially as an example of the arrangement of servo areas to which servo data is written. In the circumferential direction, a space between the two servo areas 41 is a data area 42 where data can be written. A plurality of concentric tracks 43 is provided in the radial direction of the magnetic disk 11. The data area 42 on the track 43 is provided with a plurality of sectors in which data of a predetermined size is written. The predetermined size is a sector size.

The servo data includes a servo mark, a gray code, a burst pattern, and a post code. The servo mark indicates the start of the servo data. The gray code includes an ID for identifying each track 43 provided in the magnetic disk 11, that is, a track number, and an ID for identifying each servo sector (that is, the servo area 41) on the track 43, that is, a servo sector number. The burst pattern is data used to detect the amount of positional deviation of the track indicated by the track number included in the gray code from the center. The track number included in the gray code is given as, for example, an integer value, and it is possible to obtain an offset amount of decimal places based on the position indicated by the track number by demodulating the burst pattern. That is, the current position of the magnetic head 22 in the radial direction is obtained by demodulating the burst pattern. The post code is data for correcting positional deviation of the shape of the track 43 defined by the gray code and the burst pattern from the ideal shape of the track 43.

When writing data to the magnetic disk 11 or reading data from the magnetic disk 11, the controller 30 executes positioning of the magnetic head 22 based on servo data read from the servo area 41 by the magnetic head 22. The positioning of the magnetic head 22 includes seek control and tracking control.

The recording face of the magnetic disk 11 is divided into at least two areas having different uses. One of the at least two areas is an LBA area, and the other of the at least two areas is a media cache area.

Figure 3:
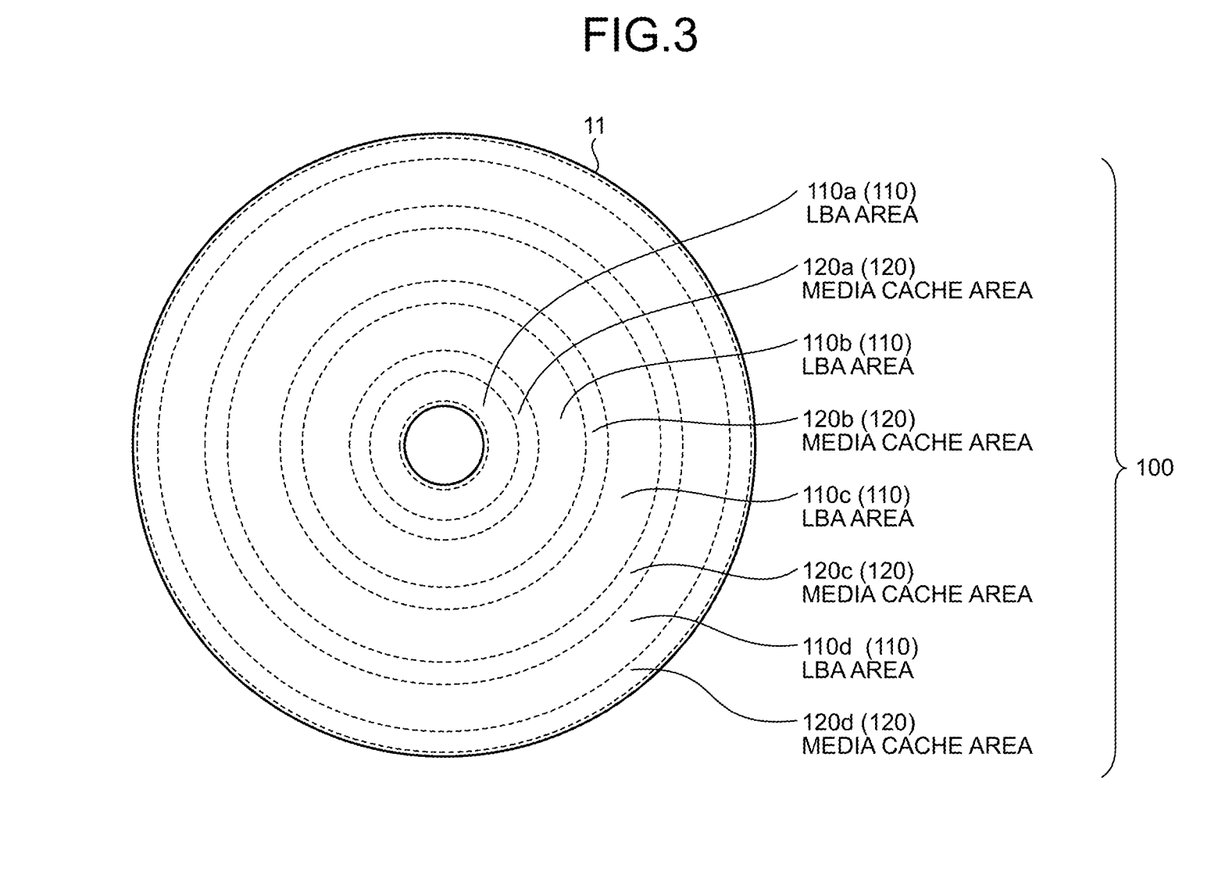
FIG. 3 is a diagram illustrating an example of a plurality of areas disposed in a radial direction of a recording face of the magnetic disk according to the embodiment.

FIG. 3 is a diagram illustrating an example of a plurality of areas disposed in the radial direction of the recording face of the magnetic disk 11 according to the embodiment.

In the example illustrated in FIG. 3, on a recording face 100 of the magnetic disk 11, an LBA area 110a, a media cache area 120a, an LBA area 110b, a media cache area 120b, an LBA area 110c, a media cache area 120c, an LBA area 110d, and a media cache area 120d are provided in this order from an inner side toward an outer side.

Hereinafter, each of the LBA area 110a, the LBA area 110b, the LBA area 110c, and the LBA area 110d may be referred to as an LBA area 110. Each of the media cache area 120a, the media cache area 120b, the media cache area 120c, and the media cache area 120d may be referred to as a media cache area 120.

LBAs are mapped to each LBA area 110. Therefore, the host 2 can designate the position of the write destination or the position of the read destination among all the LBA areas 110. Each LBA area 110 is a final storage destination of data (hereinafter, it is referred to as write data) requested to be written by a write command from the host 2.

Each media cache area 120 is used as a temporary storage location of write data.

The number and positions of the media cache areas 120 provided on the recording face 100 are not limited to the example illustrated in FIG. 3. Furthermore, the number and positions of the LBA areas 110 provided on the recording face 100 are not limited to the example illustrated in FIG. 3. The recording face 100 may be provided with an area for an any use in addition to the LBA area 110 and the media cache area 120.

Each media cache area 120 is an example of a first area. Each LBA area 110 is an example of a second area.

Figure 4:
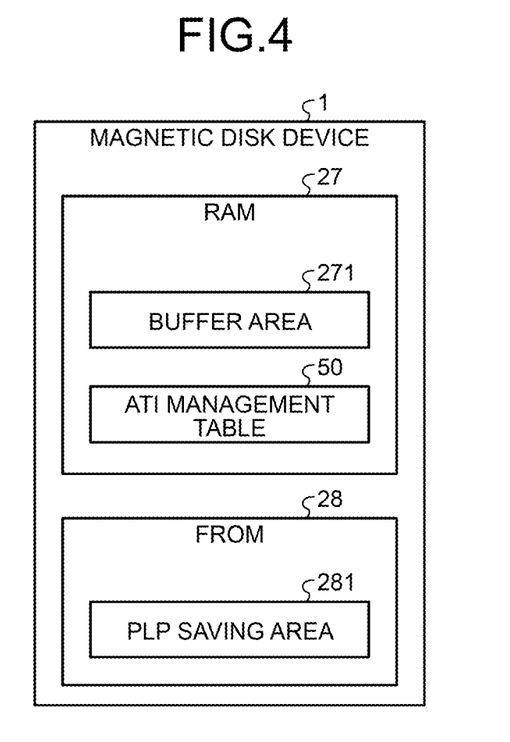
FIG. 4 is a schematic diagram illustrating an example of a configuration of a memory included in the magnetic disk device according to the embodiment.

FIG. 4 is a schematic diagram illustrating an example of a configuration of a memory (that is, the RAM 27 and the FROM 28) included in the magnetic disk device 1 according to the embodiment.

A buffer area 271 is allocated in the RAM 27. The buffer area 271 stores write data received from the host 2. That is, the buffer area 271 receives the write data received from the host 2.

The RAM 27 is a volatile memory. Therefore, the write data stored in the buffer area 271 is lost from the buffer area 271 at the time of the power supply interruption. The magnetic disk device 1 of the embodiment has a power loss protection (PLP) function in order to prevent the write data from being lost from the magnetic disk device 1 when the write data in the buffer area 271 is lost.

According to the PLP function, when the power supply interruption occurs, the magnetic disk device 1 saves the write data in the buffer area 271 to the FROM 28 using the preliminary power such as the back electromotive force generated by the SPM 12. The saving includes transfer, movement, or copy. The FROM 28 is provided with a PLP saving area 281 that is an area for saving write data. Since the FROM 28 is a nonvolatile memory, the write data saved in the PLP saving area 281 is not lost even after the power supply interruption. As a result, the write data received in the buffer area 271 is protected from loss due to the power supply interruption.

In the embodiment, as an example, the capacity of the PLP saving area 281 is smaller than the capacity of the buffer area 271. Therefore, every time the amount of write data newly stored in the buffer area 271 reaches a predetermined amount of which data can be saved in the PLP saving area 281 (for example, the same amount as the capacity of the PLP saving area 281), the controller 30 copies the write data newly stored in the buffer area 271 to any media cache area 120. Hereinafter, the predetermined amount is referred to as a first amount.

Among the write data stored in the buffer area 271, original write data whose copy has been written to the media cache area 120 is lost from the buffer area 271 when the power supply interruption occurs. After the power supply is resumed, the write data as the original write data is restored in the buffer area 271 based on the copy stored in the media cache area 120.

Among the write data stored in the buffer area 271, the amount of write data not yet copied to any media cache area 120 is controlled to be equal to or less than the first amount. Therefore, among the write data stored in the buffer area 271, all the write data not yet copied to any of the media cache areas 120 is saved to the PLP saving area 281 in response to the power supply interruption.

Therefore, all the write data stored in the buffer area 271 is prevented from being lost from the magnetic disk device 1 due to power supply interruption.

Hereinafter, write data that has not yet been written to any LBA area 110 after being received from the host 2 will be referred to as temporary stored data. The temporarily stored data includes the write data stored in the buffer area 271, a copy of the write data stored in the media cache area 120, and the write data saved in the PLP saving area 281.

Among the write data in the buffer area 271, write data whose copy has not yet been written to any media cache area 120 will be referred to as unprotected temporarily stored data.

Further, a copy of the write data written to each media cache area 120 is referred to as copy data.

The RAM 27 stores an ATI management table 50. The ATI management table 50 is used to estimate the degree of influence of ATI. Each media cache area 120 is divided into a plurality of blocks, and the degree of influence of ATI is estimated for each block based on the ATI management table 50.

Figure 5:
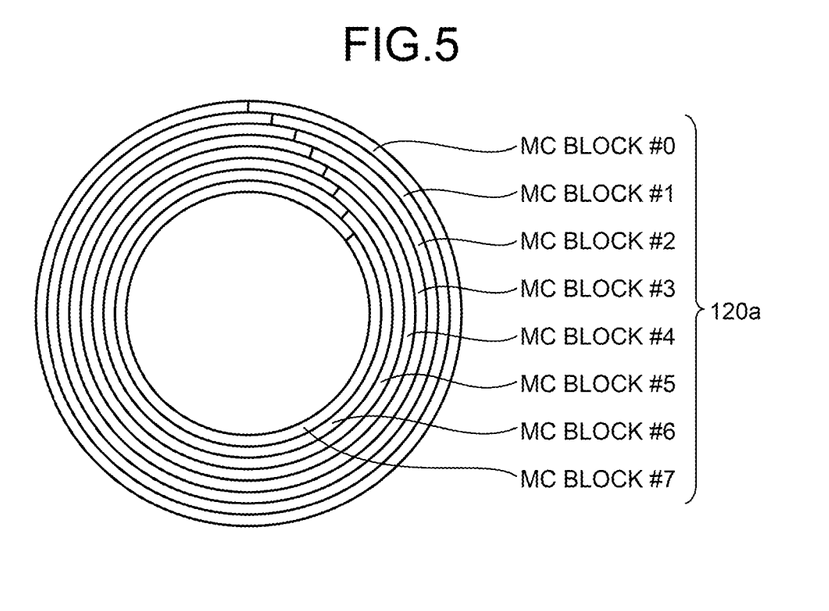
FIG. 5 is a schematic diagram for describing an example of a plurality of blocks provided in each media cache area of the embodiment.

FIG. 5 is a schematic diagram for explaining an example of a plurality of blocks provided in each media cache area 120. In the drawing, a media cache area 120a is illustrated as a representative of the media cache areas 120a to 120d.

The media cache area 120a is divided into eight MC blocks as a plurality of blocks. Identification numbers #0 to #7 are assigned to the eight MC blocks. The identification number of the MC block is referred to as an MC block number.

Each of the eight MC blocks has a capacity equal to or slightly larger than the first amount. Therefore, a copy of the first amount of unprotected temporarily stored data can be stored in each of the eight MC blocks.

Each of the eight MC blocks may occupy an area of less than one track or may occupy an area of one or more tracks. Each of the eight MC blocks may be configured by one track. The capacity of each of the eight MC blocks is not limited to the example described above. Each of the eight MC blocks may have a capacity that is twice or more the first amount.

The number of MC blocks included in each media cache area 120 is any number as long as it is plural. The number of MC blocks included in one media cache area 120 may be common or may not be common among the media cache areas 120a to 120d.

Figure 6:
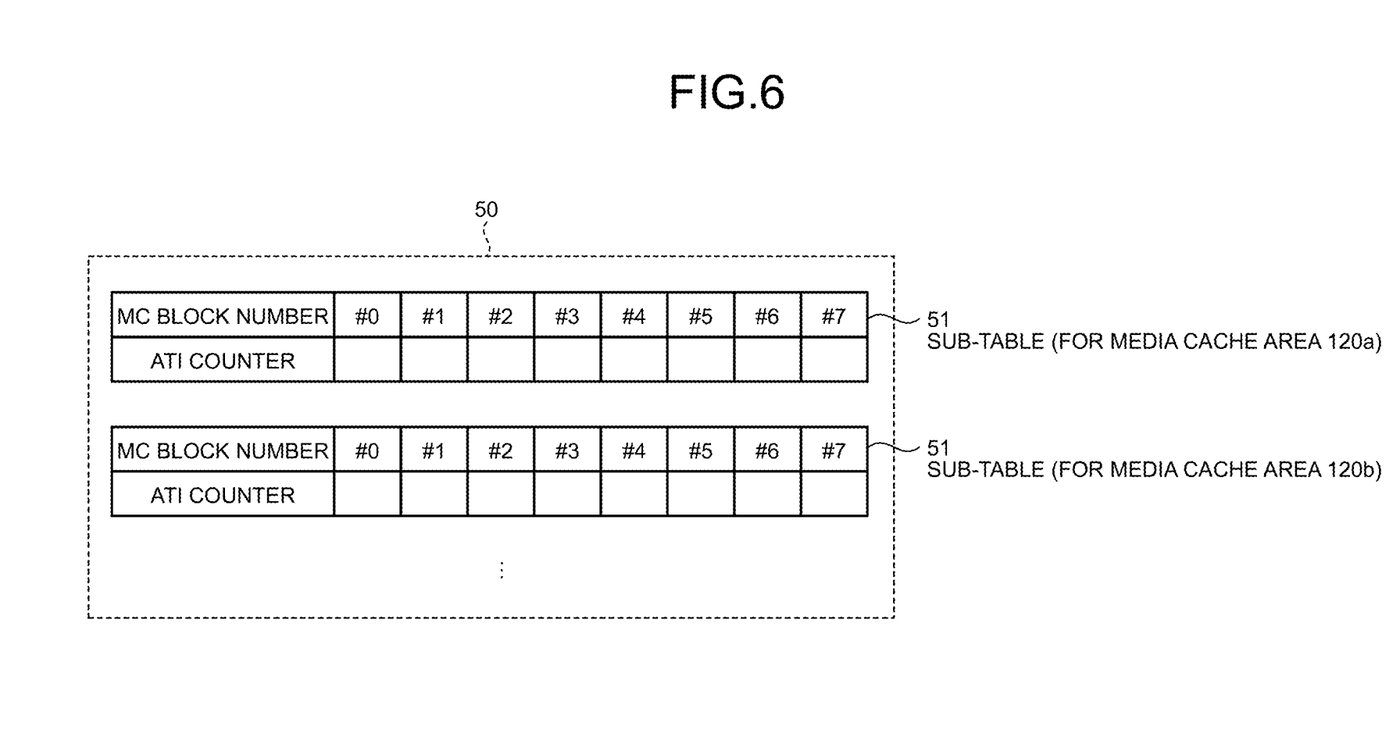
FIG. 6 is a schematic diagram illustrating an example of a data structure of an ATI management table according to the embodiment.

FIG. 6 is a schematic diagram illustrating an example of a data structure of the ATI management table 50. In the example illustrated in the drawing, the ATI management table 50 includes a sub-table 51 for each media cache area 120. Each sub-table 51 is a table in which an ATI counter is recorded for each MC block number.

When new copy data is written to a certain MC block, an ATI counter for an MC block in which copy data of any temporary storage data is already stored among MC blocks adjacent to the MC block to which the new copy data is written to is incremented by "1". When the original temporarily stored data in the buffer area 271 corresponding to all the copy data stored in an MC block is written to the LBA area 110, the ATI counter for the MC block is reset to "0".

That is, the ATI counter indicates, regarding an MC block storing copy data, the number of times of writing to an adjacent MC block. In the embodiment, as an example, a difference of an ATI counter of an MC block from the minimum value of ATI counters among a media cache area 120 to which the MC block belongs to is regarded as the estimation value of the degree of ATI influence which the MC block has received. The difference is referred to as an ATI estimation value.

In general, the influence of ATI received by the adjacent track accumulates according to the number of writes for one track, and the data of the adjacent track is eventually difficult to be read. For example, in each LBA area 110, the controller 30 rewrites all the data to the adjacent track 43 before it is difficult to read the data of the adjacent track 43. Such rewrite for preventing the read from becoming difficult due to the influence of ATI will be referred to as an ATI refresh operation.

Here, a technique compared with that of the embodiment will be described. A technique compared with that of the embodiment is referred to as a comparative example. According to the comparative example, as in the embodiment, copying of temporary storage data to the media cache area is performed in a timely manner so that the amount of unprotected temporary storage data does not exceed the first amount. In addition, the ATI refresh operation is also executed in the media cache area.

In the comparative example, when the ATI refresh operation is executed in the media cache area, the process of copying temporary storage data to the media cache area is delayed by execution of the ATI refresh operation. As a result, the rate of reception of new write data from the host decreases. That is, the write performance of the magnetic disk device may be deteriorated by the ATI refresh operation in the media cache area.

In the embodiment, in order to eliminate the need for the ATI refresh operation in the media cache area 120, when the estimation value of the degree of influence of ATI received by a certain MC block (referred to as a first MC block) reaches a predetermined level (referred to as a first threshold value), the controller 30 sets the MC blocks adjacent to the first MC block to be unwritable. Since writing to the MC blocks adjacent to the first MC block is prohibited, accumulation of the influence of ATI received by the first MC block is stopped. This prevents difficulty in reading data in the first MC block even if the ATI refresh operation is not executed on the first MC block.

Next, details of the operation of the magnetic disk device 1 of the embodiment will be described.

Figure 7:
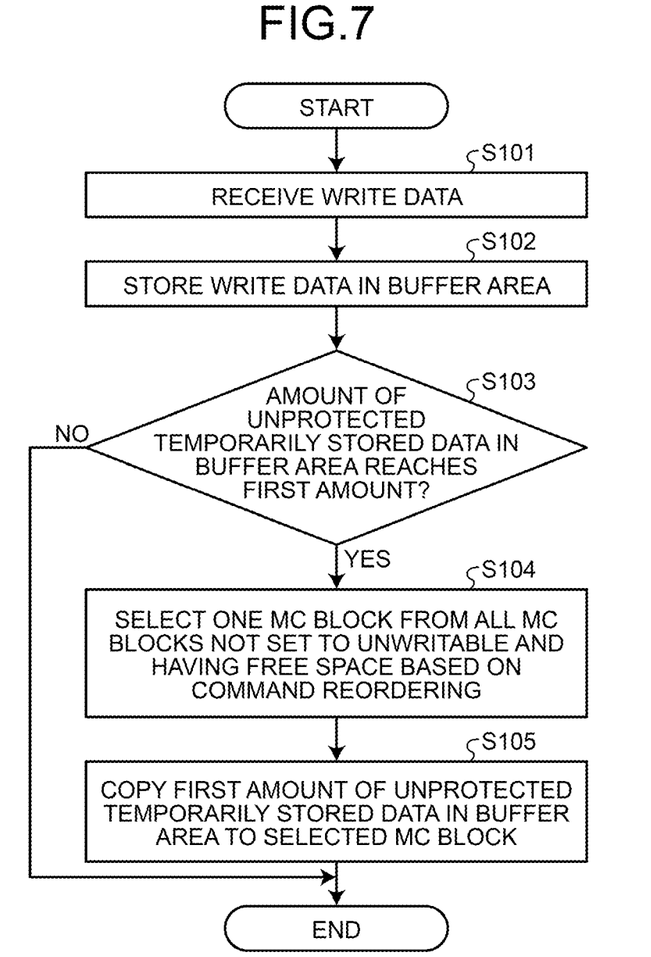
FIG. 7 is a flowchart illustrating an example of an operation in response to reception of write data of the magnetic disk device according to the embodiment.

FIG. 7 is a flowchart illustrating an example of an operation according to reception of write data of the magnetic disk device 1 of the embodiment. Note that a series of operations illustrated in this drawing is executed, for example, every time the magnetic disk device 1 receives write data.

When the magnetic disk device 1 receives write data from the host 2 (S101), the controller 30 stores the write data in the buffer area 271 (S102). Then, the controller 30 determines whether the amount of unprotected temporarily stored data in the buffer area 271 reaches the first amount (S103).

When the amount of the unprotected temporarily stored data in the buffer area 271 has not reached the first amount (S103: No), the operation related to the write data received by the process of S101 ends.

When the amount of unprotected temporarily stored data in the buffer area 271 reaches the first amount (S103: Yes), the controller 30 selects one MC block from all MC blocks which are not set to be unwritable and have free space (S104).

In the process of S104, the controller 30 selects one MC block based on command reordering. That is, the controller 30 selects the MC block that can be written earliest or as soon as possible based on the current position and moving speed of the magnetic head 22 and the positions of all the MC blocks that are not set to be unwritable and have free space.

The controller 30 copies the first amount of unprotected temporarily stored data in the buffer area 271 to the MC block selected by the process of S104 (S105). Then, the operation corresponding to the reception of the write data ends.

Figure 8:
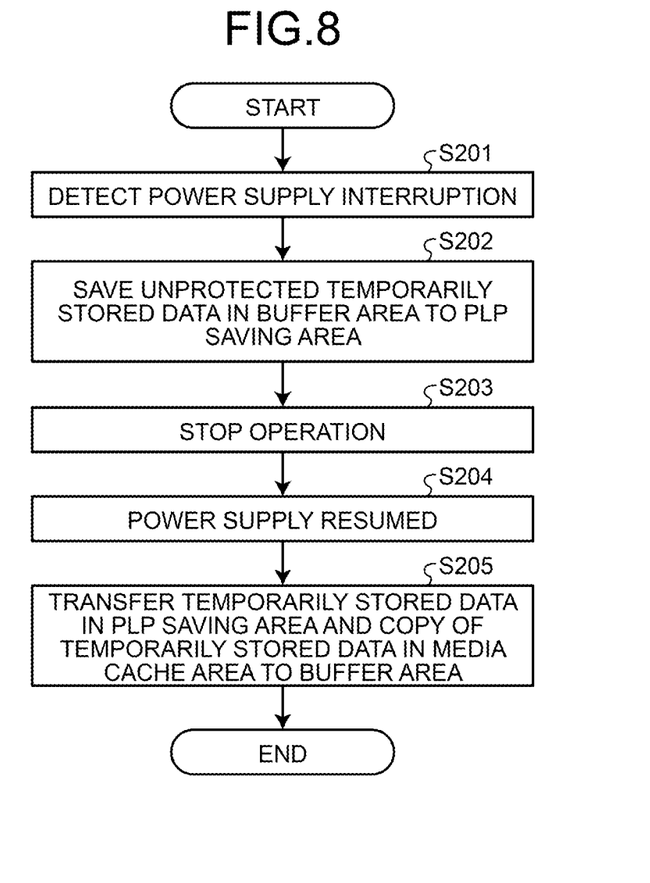
FIG. 8 is a flowchart illustrating an example of an operation related to a PLP function of the magnetic disk device according to the embodiment.

FIG. 8 is a flowchart illustrating an example of an operation related to the PLP function of the magnetic disk device 1 of the embodiment.

When the power supply from the outside to the magnetic disk device 1 is stopped, the controller 30 detects the stop of the power supply as power supply interruption (S201).

For example, the controller 30 monitors a voltage of a power line (not illustrated) to which power is externally supplied. Then, when the voltage of the power line falls below a predetermined value, the controller 30 determines that the power supply interruption has occurred. Note that the method of detecting the power supply interruption is not limited thereto.

In response to the detection of the power supply interruption, the controller 30 saves the unprotected temporarily stored data in the buffer area 271 to the PLP saving area 281 (S202). The process of S202 is executed using, for example, a back electromotive force generated by the SPM 12. The amount of unprotected temporarily stored data in the buffer area 271 is controlled to be equal to or less than the first amount by a series of operations illustrated in FIG. 7. Therefore, in the process of S202, the controller 30 can save all the unprotected temporarily stored data in the buffer area 271 to the PLP saving area 281.

Following the process of S202, the magnetic disk device 1 stops the operation (S203).

Thereafter, when the power supply to the magnetic disk device 1 is resumed, the controller 30 transfers the temporarily stored data in the PLP saving area 281 and the copy data in the media cache area 120 to the buffer area 271 (S204). As a result, the temporarily stored data stored in the buffer area 271 immediately before the power supply interruption is restored in the buffer area 271. Then, the operation related to the PLP function ends.

Figure 9:
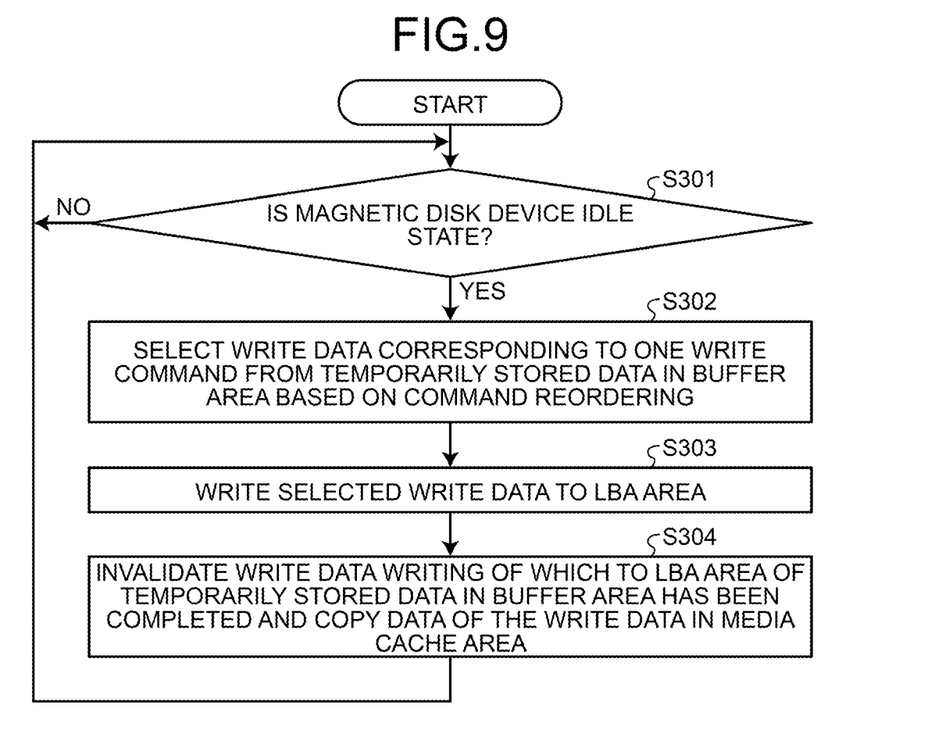
FIG. 9 is a flowchart illustrating an example of an operation of writing temporarily stored data in a buffer area to an LBA area in the magnetic disk device according to the embodiment.

FIG. 9 is a flowchart illustrating an example of an operation of writing temporarily stored data in the buffer area 271 to the LBA area 110 in the magnetic disk device 1 according to the embodiment.

The controller 30 determines whether the magnetic disk device 1 is in an idle state (S301). The idle state is, for example, a state in which a period during which no access command is received from the host 2 exceeds a predetermined time.

When the magnetic disk device 1 is not in the idle state (S301: No), the process of S301 is executed again.

When the magnetic disk device 1 is in the idle state (S301: Yes), the controller 30 selects write data related to one write command from the temporarily stored data in the buffer area 271 (S302). Here, the controller 30 selects the write data based on the command reordering. That is, write data that can be written to the write destination sector earliest or as soon as possible is selected.

The controller 30 writes the selected write data to the LBA area 110 (S303). Then, the controller 30 invalidates the write data writing of which to the LBA area 110 in the buffer area 271 has been completed and the copy data of the write data in the media cache area 120 (S305). Then, the controller 30 executes the process of S301 again.

Invalidation is making it unusable. The invalidation may be erasing. Hereinafter, the state of data that has not been invalidated is referred to as valid.

In the example illustrated in FIG. 9, writing of the temporarily stored data to the LBA area 110 is executed when the magnetic disk device 1 is in the idle state. Conditions under which writing of the temporarily stored data to the LBA area 110 is executed are not limited thereto. For example, writing of the temporarily stored data to the LBA area 110 may be executed when the buffer area 271 is full of valid temporarily stored data.

By the operations illustrated in FIGS. 7 and 9, copy data corresponding to the original write data is stored in the MC block during a period from when the original write data is stored in the buffer area 271 to when the original write data is written to the LBA area 110.

Figure 10:
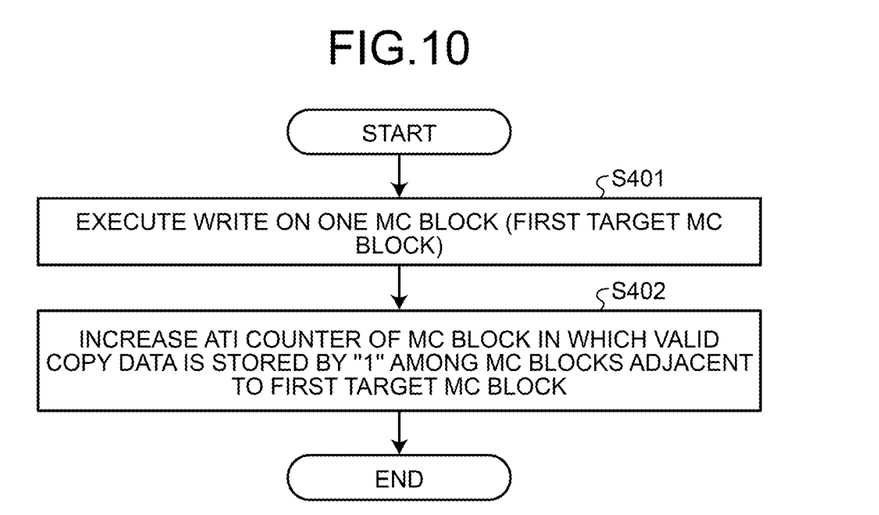
FIG. 10 is a flowchart illustrating an example of an operation of incrementing an ATI counter according to the embodiment.

FIG. 10 is a flowchart illustrating an example of an operation of incrementing the ATI counter according to the embodiment.

The controller 30 executes writing on one MC block (S401). Specifically, the process of S40 corresponds to the process of S105 illustrated in FIG. 7. The MC block in which the copy data is written by the process of S401 is referred to as a first target MC block.

Following the process of S401, the controller 30 increments the ATI counter of the MC block storing the valid copy data by "1" among the MC blocks adjacent to the first target MC block (S402). The operation of incrementing the ATI counter ends.

The series of operations illustrated in FIG. 10 is executed every time the process of S105 illustrated in FIG. 7 is executed.

Figure 11:
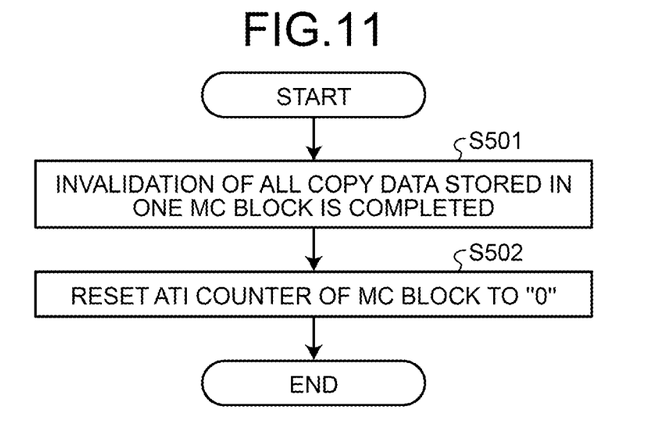
FIG. 11 is a flowchart illustrating an example of an operation of resetting the ATI counter according to the embodiment.

FIG. 11 is a flowchart illustrating an example of an operation of resetting the ATI counter according to the embodiment.

According to the series of operations illustrated in FIG. 9, the copy data in each MC block is invalidated in units of write commands. Therefore, valid copy data and invalid copy data may be mixed in one MC block.

When invalidation of all the copy data stored in one MC block is completed by executing the series of operations illustrated in FIG. 9 one or more times (S501), the controller 30 resets the ATI counter of the MC block to "0" (S502). Then, the operation of resetting the ATI counter ends.

Figure 12:
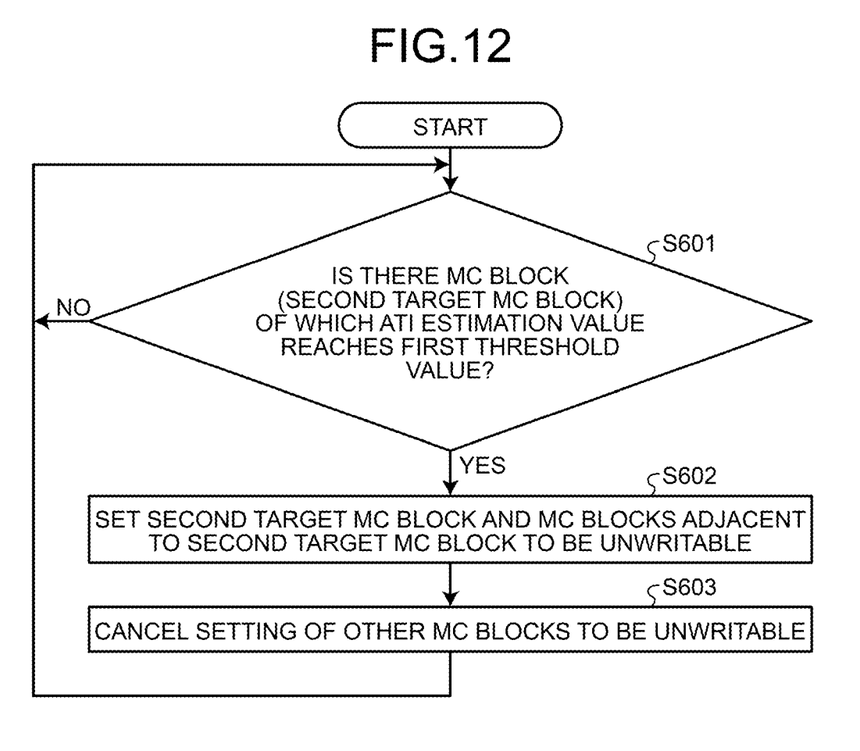
FIG. 12 is a flowchart illustrating an example of an operation of unwritable setting based on the ATI counter according to the embodiment.

FIG. 12 is a flowchart illustrating an example of an operation of unwritable setting based on the ATI counter according to the embodiment.

The controller 30 determines whether there is an MC block of which an ATI estimation value reaches the first threshold value in any of the media cache areas 120 (S601). The MC block of which the ATI estimation value reaches the first threshold value is referred to as a second target MC block.

When there is the second target MC block (S601: Yes), the controller 30 sets the second target MC block and the MC blocks adjacent to the second target MC block to be unwritable (S602). Then, the controller 30 cancels the setting of other MC blocks (More precisely, all MC blocks except the second target MC block and except MC blocks adjacent to the second target MC block) to be unwritable (S603). When there is no other MC block set to be unwritable, the controller 30 executes nothing in the process of S603.

When there is no second target MC block (S601: No), the controller 30 skips the process of S602.

After the process of S603, the controller 30 executes the process of S601 again.

Figure 13A:
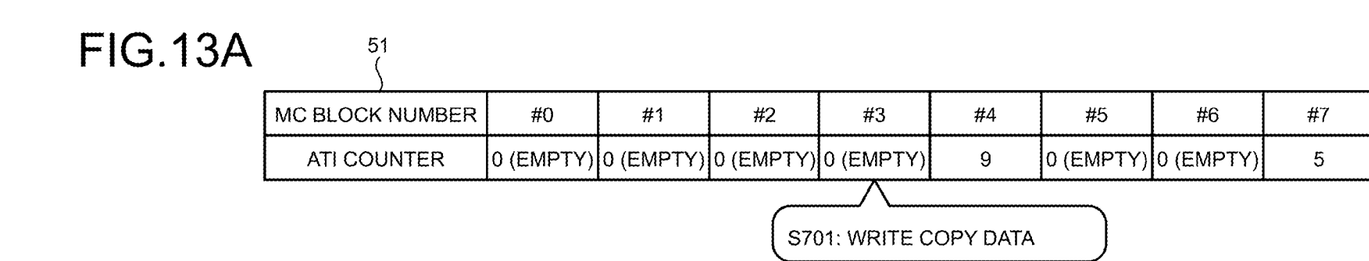
FIGS. 13A to 13C are schematic diagrams for describing a specific example of the operation illustrated in FIGS. 10 to 12.
Figure 13B:
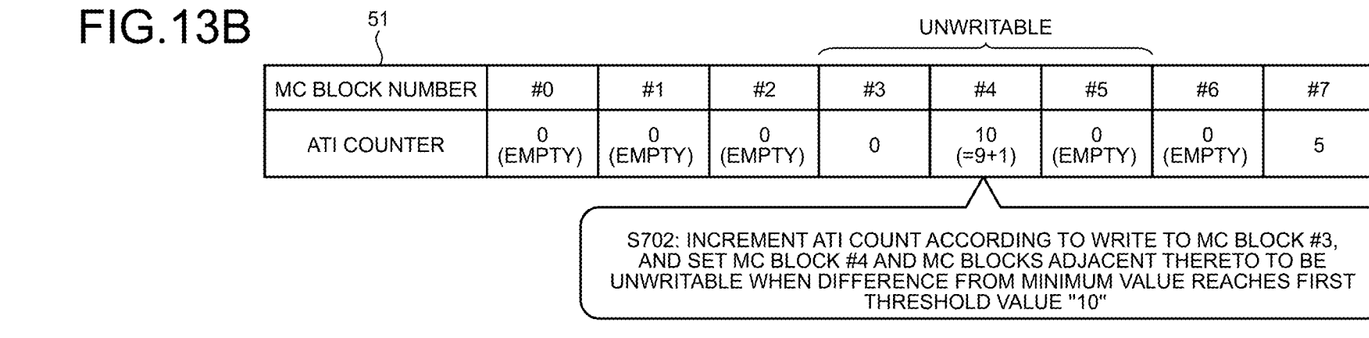
Figure 13C:
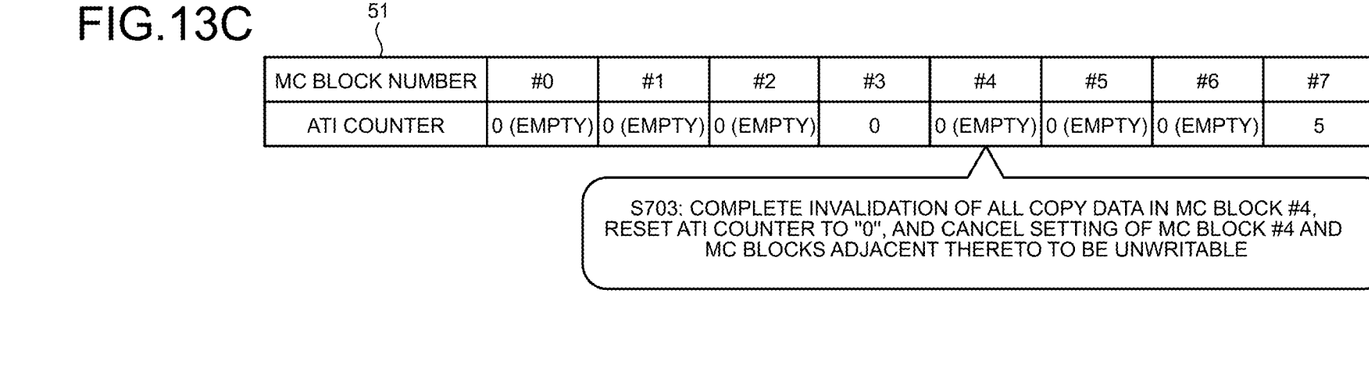

FIGS. 13A to 13C are schematic diagrams for describing a specific example of the operation illustrated in FIGS. 10 to 12. Each of FIG. 13A to 13C illustrates a sub-table 51 related to a certain media cache area 120 among the sub-tables 51 included in the ATI management table 50.

Note that, in the description of the example illustrated in FIGS. 13A to 13C, the first threshold value is assumed to be "10".

According to the sub-table 51 illustrated in FIG. 13A, the MC blocks #0 to #3, #5, and #6 are in an empty state, and accordingly, the ATI counter for each of the MC blocks #0 to #3, #5, and #6 is "0". Valid copy data is stored in the MC block #4, and the ATI counter for the MC block #4 is "9". Valid copy data is also stored in the MC block #7, and the ATI counter for the MC block #7 is "5".

"Empty" means that valid copy data is not stored.

When the ATI counter for each MC block is in the state illustrated in FIG. 13A, the controller 30 writes the copy data to the MC block #3 (S701). Then, as illustrated in FIG. 13B, the controller 30 increments the ATI counter for the MC block #4 that is an MC block storing valid copy data among the MC block #2 and the MC block #4 that are MC blocks adjacent to the MC block #3 by "1". As a result, the difference (which is the ATI estimation value) of the ATI counter for the MC block #4 from "0", that is the minimum value of the ATI counters recorded in the sub-table 51, reaches "10" that is the first threshold value. Therefore, the controller 30 sets the MC block #4 and the MC blocks #3 and #5 adjacent to the MC block #4 to be unwritable (S702). That is, in order to prevent further accumulation of the influence of ATI on the MC block #4, writing to the MC block #5 is prohibited even though the MC block #5 is empty.

Subsequently, as illustrated in FIG. 13C, when the controller 30 completes the invalidation of all the copy data in the MC block #4, the controller 30 resets the ATI counter for the MC block #4 to "0", and cancels setting of the MC block #4 and the MC blocks #3 and #5 adjacent to the MC block #4 to be unwritable (S703). As a result, the controller 30 can write data to the empty MC blocks #4 and #5.

Note that, in the above description, it is described that the controller 30 writes the copy of the unprotected temporarily stored data to the media cache area 120 for each first amount. The amount of copy data written to the media cache area 120 at one time is not limited thereto.

For example, the configuration may be such that the PLP saving area 281 is not provided in the FROM 28, and the controller 30 copies all temporarily stored data stored in the buffer area 271 to the media cache area 120 at an any timing.

In addition, an example of an ATI estimation value is not limited to a difference of an ATI counter of an MC block from the minimum value of ATI counters among a media cache area 120 to which the MC block belongs to.

In an example, the controller 30 may treat the ATI counter itself as an ATI estimation value. In another example, a difference of an ATI counter of an MC block from the minimum value of ATI counters among all the media cache areas 120 may be treated as an ATI estimation value.

As described above, according to the embodiment, the controller 30 estimates the degree of influence of ATI for each of the plurality of MC blocks, and sets the MC block (referred to as a first MC block) in which the degree of influence of ATI reaches the first threshold value among the plurality of MC blocks and the two MC blocks adjacent to the first MC block among the plurality of MC blocks to be unwritable. The controller 30 selects one of one or more MC blocks which are not set to be unwritable and have free space among the plurality of blocks, and stores a copy of write data in the buffer area 271 in the selected one block at least for a period until the write data is written to the LBA area 110.

Therefore, it is possible to prevent data reading from becoming difficult due to the influence of ATI without requiring execution of an ATI refresh operation in any media cache area 120. Since the ATI refresh operation is not executed in any of the media cache areas 120, deterioration of the write performance of the magnetic disk device 1 is suppressed.

In addition, according to the embodiment, the magnetic disk device 1 copies the temporarily stored data that has not yet been copied to the media cache area 120 to the selected MC block every time the amount of the temporarily stored data that has not yet been copied to the media cache area 120 among the temporarily stored data received in the buffer area 271 reaches the first amount. When the power supply interruption occurs, the controller 30 saves temporarily stored data that has not yet been copied to the media cache area 120 to the PLP saving area 281. When the power supply is started after the power supply interruption, the controller 30 restores the temporarily stored data in the buffer area 271 based on the copy data stored in the media cache area 120 and the temporarily stored data saved in the PLP saving area 281.

Therefore, the write data in the buffer area 271 is prevented from being lost from the magnetic disk device 1 due to the power supply interruption.

In addition, according to the embodiment, the controller 30 manages a group of the ATI counters for each MC block. When the copy data is written to a certain MC block (referred to as a second MC block), the controller 30 increments an ATI counter for an MC block storing valid copy data, that is, a copy of temporarily stored data writing of which to the LBA area 110 has not yet been completed, among two MC blocks adjacent to the second MC block. The controller 30 resets an ATI counter for an MC block in which the invalidation of all the stored copy data is completed. The controller 30 estimates the degree of influence of ATI for each MC block based on its ATI counter. Specifically, the controller 30 identifies the MC block in which the difference of the ATI counter from the minimum value reaches the first threshold value as the first MC block.

Therefore, the controller 30 can stop accumulation of the influence of ATI received by the first MC block before it is difficult to read the copy data stored in the first MC block.

Note that, as described above, the controller 30 may use ATI counters as estimation values of the degree of influence of ATI. Furthermore, the controller 30 may use a difference of an ATI counter of an MC block from the minimum value of ATI counters among all the media cache areas 120 to which the MC block belongs to as an estimation value of the degree of influence of ATI. That is, the controller 30 can estimate the degree of influence of ATI based on the ATI counter.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk provided with a first area including a plurality of blocks and a second area designated as a write destination by a host;
   a volatile first memory that receives write data received from the host;
   a magnetic head that writes and reads data to and from the magnetic disk; and
   a controller that
      estimates a degree of influence of adjacent track interference (ATI) for each of the plurality of blocks,
      sets, to be unwritable, a first block among the plurality of blocks, the first block being a block in which a degree of influence of ATI reaches a first threshold value and two blocks adjacent to the first block among the plurality of blocks,
      selects one of one or more blocks that are not set to be unwritable and have free space among the plurality of blocks, and
      stores a copy of write data in the first memory in the selected one block at least for a period until the write data is written to the second area.

2. The magnetic disk device according to claim 1, further comprising:
   a non-volatile second memory, wherein
   the controller
      stores write data not yet copied to any of the plurality of blocks in one block selected from the plurality of blocks every time an amount of write data not yet copied to any of the plurality of blocks among write data received by the first memory reaches a first amount,
      saves, in the second memory, write data not yet copied to any of the plurality of blocks when power supply interruption occurs, and
      when power supply is started after the power supply interruption, restores write data in the first memory based on one or more copies stored in the plurality of blocks and write data saved in the second memory.

3. The magnetic disk device according to claim 2, wherein
   the controller
      manages a plurality of counters each of which is a counter for one of the plurality of blocks,
      in a case where a copy of write data in the first memory is written to a second block that is one block among the plurality of blocks, increments a counter for a block storing a copy of original write data writing of which to the second area is not yet completed among two blocks adjacent to the second block among the plurality of blocks, resets a counter for a block in which writing of original write data of all stored copies to the second area is completed among the plurality of blocks, and estimates a degree of influence of ATI for each of the plurality of blocks based on the plurality of counters.

4. The magnetic disk device according to claim 3, wherein the controller identifies, as the first block, a block in which a difference from a minimum value of the plurality of counters reaches the first threshold value.

5. The magnetic disk device according to claim 1, wherein the controller manages a plurality of counters each of which is a counter for one of the plurality of blocks, in a case where a copy of write data in the first memory is written to a second block that is one block among the plurality of blocks, increments a counter for a block storing a copy of original write data writing of which to the second area is not yet completed among two blocks adjacent to the second block among the plurality of blocks, resets a counter for a block in which writing of original write data of all stored copies to the second area is completed among the plurality of blocks, and estimates a degree of influence of ATI for each of the plurality of blocks based on the plurality of counters.

6. The magnetic disk device according to claim 5, wherein the controller identifies, as the first block, a block in which a difference from a minimum value of the plurality of counters reaches the first threshold value.

7. The magnetic disk device according to claim 1, wherein the controller identifies, as the first block, a block in which a degree of influence of ATI reaches a first threshold value among the plurality of blocks, sets two third blocks that are the two blocks adjacent to the identified first block to be unwritable, and sets a first block corresponding to neither the first block nor the two third blocks among the plurality of blocks to be writable.

8. The magnetic disk device according to claim 7, further comprising:

a non-volatile second memory, wherein the controller stores write data not yet copied to any of the plurality of blocks in one block selected from the plurality of blocks every time an amount of write data not yet copied to any of the plurality of blocks among write data received by the first memory reaches a first amount, saves, in the second memory, write data not yet copied to any of the plurality of blocks when power supply interruption occurs, and when power supply is started after the power supply interruption, restores write data in the first memory based on one or more copies stored in the plurality of blocks and write data saved in the second memory.

9. The magnetic disk device according to claim 7, wherein the controller manages a plurality of counters each of which is a counter for one of the plurality of blocks, in a case where a copy of write data in the first memory is written to a second block that is one block among the plurality of blocks, increments a counter for a block storing a copy of original write data writing of which to the second area is not yet completed among two blocks adjacent to the second block among the plurality of blocks, resets a counter for a block in which writing of original write data of all stored copies to the second area is completed among the plurality of blocks, and estimates a degree of influence of ATI for each of the plurality of blocks based on the plurality of counters.

10. The magnetic disk device according to claim 9, wherein the controller identifies, as the first block, a block in which a difference from a minimum value of the plurality of counters reaches the first threshold value.

11. A method of controlling a magnetic disk device including a magnetic disk and a volatile first memory, the method comprising:

storing write data received from a host in the first memory;

estimating a degree of influence of adjacent track interference (ATI) for each of a plurality of blocks, wherein the magnetic disk is provided with a first area and a second area, the plurality of blocks is included in the first area, and the second area is an area designated as a write destination by the host;

setting a first block among the plurality of blocks, the first block being a block in which a degree of influence of ATI reaches a first threshold value, and two blocks adjacent to the first block among the plurality of blocks to be unwritable;

selecting one of one or more blocks that are not set to be unwritable and have free space among the plurality of blocks;

writing write data in the first memory to the second area; and storing a copy of write data in the first memory in the selected one block at least for a period until the write data is written to the second area.

12. The method of claim 11, further comprising:

storing write data not yet copied to any of the plurality of blocks in one block selected from the plurality of blocks every time an amount of write data not yet copied to any of the plurality of blocks among write data in the first memory reaches a first amount;

saving write data not yet copied to any of the plurality of blocks to a non-volatile second memory included in the magnetic disk device when power supply interruption occurs; and restoring write data in the first memory based on a copy of write data stored in the plurality of blocks and write data saved in the second memory in a case where power supply is started after the power supply interruption.

13. The method of claim 12, further comprising:

managing a plurality of counters each of which is a counter for one of the plurality of blocks;

in a case where a copy of write data in the first memory is written to a second block that is one block among the plurality of blocks, incrementing a counter for a block storing a copy of original write data writing of which to the second area is not yet completed among two blocks adjacent to the second block among the plurality of blocks;

resetting a counter for a block in which writing of original write data of all stored copies to the second area is completed among the plurality of blocks; and estimating a degree of influence of ATI for each of the plurality of blocks based on the plurality of counters.

14. The method of claim 13, further comprising:

identifying, as the first block, a block in which a difference from a minimum value of the plurality of counters reaches the first threshold value.

15. The method of claim 11, further comprising:
managing a plurality of counters each of which is a counter for one of the plurality of blocks;
in a case where a copy of write data in the first memory is written to a second block that is one block among the plurality of blocks, incrementing a counter for a block storing a copy of original write data writing of which to the second area is not yet completed among two blocks adjacent to the second block among the plurality of blocks;
resetting a counter for a block in which writing of original write data of all stored copies to the second area is completed among the plurality of blocks; and
estimating a degree of influence of ATI for each of the plurality of blocks based on the plurality of counters.

16. The method of claim 15, further comprising:
identifying, as the first block, a block in which a difference from a minimum value of the plurality of counters reaches the first threshold value.

17. The method of claim 11, further comprising:
identifying, as the first block, a block in which a degree of influence of ATI reaches a first threshold value among the plurality of blocks;
setting two third blocks that are the two blocks adjacent to the identified first block to be unwritable; and
setting a first block corresponding to neither the first block nor the two third blocks among the plurality of blocks to be writable.

18. The method of claim 17, further comprising:
storing write data not yet copied to any of the plurality of blocks in one block selected from the plurality of blocks every time an amount of write data not yet copied to any of the plurality of blocks among write data in the first memory reaches a first amount;
saving write data not yet copied to any of the plurality of blocks to a non-volatile second memory included in the magnetic disk device when power supply interruption occurs; and
restoring write data in the first memory based on a copy of write data stored in the plurality of blocks and write data saved in the second memory in a case where power supply is started after the power supply interruption.

19. The method of claim 17, further comprising:
managing a plurality of counters each of which is a counter for one of the plurality of blocks;
in a case where a copy of write data in the first memory is written to a second block that is one block among the plurality of blocks, incrementing a counter for a block storing a copy of original write data writing of which to the second area is not yet completed among two blocks adjacent to the second block among the plurality of blocks;
resetting a counter for a block in which writing of original write data of all stored copies to the second area is completed among the plurality of blocks; and
estimating a degree of influence of ATI for each of the plurality of blocks based on the plurality of counters.

20. The method of claim 19, further comprising:
identifying, as the first block, a block in which a difference from a minimum value of the plurality of counters reaches the first threshold value.

* * * * *